Jan. 2, 1962 D. EKLOV 3,015,781
DEVICE FOR THE PROTECTION OF ELECTRICAL APPARATUS AGAINST EXCESS VOLTAGE
Filed Dec. 26, 1957
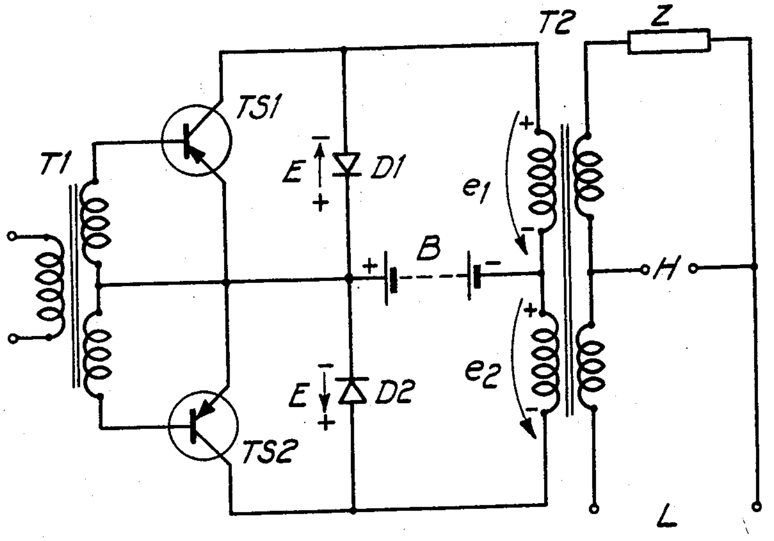
INVENTOR.
DAVID EKLOV
BY Strauch, Nolan & Neale
ATTORNEYS United States Patent Office 3,015,781

Patented Jan. 2, 1962

3,015,781

DEVICE FOR THE PROTECTION OF ELECTRICAL APPARATUS AGAINST EXCESS VOLTAGE

David Eklov, 23 Stavsjovagen, Alvsjo, Sweden

Filed Dec. 26, 1957, Ser. No. 705,314

Claims priority, application Sweden Oct. 30, 1957

3 Claims. (Cl. 330—15)

The present invention relates to a device for the protection of electrical apparatus against excess voltage. The invention is particularly applicable to telecommunication amplifiers which are connected to lines on which excess voltage may appear.

The device according to the invention is especially suitable for use in transistor amplifiers included in telephone instruments, such for example as the loud speaking telephone described in my co-pending application Serial No. 705,382 filed on even date herewith, which are connected to telephone lines on which transient voltages of large magnitude may appear. This voltage may be transferred over the output circuit of the amplifier to amplifying elements which being transistors are easily damaged.

It is accordingly a principal object of the present invention to provide a novel circuit arrangement for protecting the transistors against high magnitude transient voltages which does not otherwise interfere with the normal operation of the circuit. Such protection is achieved in an inexpensive manner by means of the circuit arrangement according to the present invention.

In its preferred form, the present invention comprises a transformer connecting the apparatus with the line, two oppositely oriented rectifiers connected in series across a winding of said transformer, and a direct voltage source connected between the junction of said rectifiers and a tap on said transformer winding to bias said rectifier in a direction opposite to the forward direction.

The invention will be described more in particular in conjunction with the accompanying drawing which shows a simplified circuit diagram of a transistor amplifier including the device according to the invention.

On the drawing T1 designates an input transformer. TS1 and TS2 are two push-pull connected transistors, B is a direct current source, and T2 an output transformer. The amplifier is intended for use as microphone amplifier in a loundspeaking telephone apparatus of my co-pending application identified above, and L designates connecting terminals for the telephone line, Z a balance impedance and H are connecting terminals for the connection of a loudspeaker amplifier.

According to the invention the amplifier is further provided with two rectifier diodes D1 and D2. It appears from the figure how these rectifier diodes are connected and oriented.

The direct current source B supplies the required D.C. energy for the operation of the transistors and it also produces a bias across the rectifier diodes D1 and D2. Due to this bias the diodes do not load the transistors to any appreciable extent.

It is now assumed that a disturbance voltage arrives over the telephone line and that this voltage produces the voltages $e_1$ and $e_2$ respectively across one of the two halves of the primary winding of transformer T2. These voltages are assumed to have the polarity indicated on the drawing. If the voltage $e_1$ exceeds the voltage E, the diode D1 will become conductive. Hereby the circuit for the disturbing voltage is so heavily loaded that the voltage $e_1$ cannot appreciably exceed the voltage E. The voltage $e_2$ will evidently be added to the voltage E across the diode D2. However, due to the load that diode D1 presents to the source of the disturbing voltage, the voltage $e_2$ cannot appreciably exceed the voltage E either. Hence the disturbing voltage can at most cause a doubling of the voltage across the transistor TS2. The voltage of the direct current source B is so chosen that it is not larger than half the maximum voltage allowable for normal operation of the transistors. Thus the change in the voltage across the transistors caused by the disturbing voltage cannot amount to a value, which is harmful to the transistors.

If the polarity of the disturbing voltage is opposite to that indicated on the drawing, the diode D2 instead of D1 will cause the desired load on the circuit for the disturbing voltage, and the device will operate in the same manner as described above.

The protective device does not prevent maximum excitation of the push-pull connected amplifier stage but becomes immediately operative as soon as a voltage incoming from the line exceeds the normal operating voltage.

What is claimed is:

1. In an amplifier, an amplifying output stage having two transistors in push-pull connection, a transformer for connecting said amplifying stage with a transmission line, said transformer having a winding with a first terminal connected to one transistor and a second terminal connected to the other transistor and a center tap between said first and second terminal, including a source of direct current for supplying operating current to said transistors through two circuits, one of said circuits including the part of said transformer winding between said center tap and said first terminal, and the other circuit including the part of said transformer winding between said center tap and said second terminal, and a protective device in the amplifying output stage load circuit for protecting the transistors against excessive voltages of either polarity that may appear on said line, said protective device consisting solely of a first rectifier connected in parallel with the series circuit of the source of direct current and the part of said transformer winding which is located between said center tap and said first terminal, and a second rectifier connected in parallel with the series circuit of the source of direct current and the part of said transformer winding which is located between said center tap and said second terminal, said rectifiers being so poled that they are biased in their reverse direction by the source of direct current.

2. An amplifier as claimed in claim 1 in which the voltage generated in said source of direct current does not exceed half the maximum voltage allowable for normal operation of the transistors.

3. In an amplifier having an amplifier stage composed of two transistors in push-pull connection, an output transformer having a primary winding connected to said amplifier stage and a secondary winding connected in a transmission line in which transient voltages occur, said primary winding having opposite end terminals connected to first corresponding electrode terminals on each of said two transistors and a tap at the center thereof, a source of operating potential for said transistors having one terminal connected to said tap at the center of said primary winding and another terminal connected to second corresponding electrode terminals on each of said two transistors, and a protective device for excessive voltages of either polarity consisting solely of a separate rectifier connected across the first and second electrode terminals of each of said two transistors, each of said rectifiers being so poled that it is biased in its reverse direction by the operating potential, and one rectifier becoming conductive in response to excessive voltage on said transmission line of one polarity and the other rectifier becoming conductive in response to excessive voltage on said transmission line of the opposite polarity and each performing its protective function independently of the other.

References Cited in the file of this patent

UNITED STATES PATENTS

| | | |
|---|---|---|
| 2,079,485 | Bousman | May 4, 1937 |
| 2,789,254 | Bodle et al. | Apr. 16, 1957 |
| 2,840,726 | Hamilton | June 24, 1958 |
| 2,841,719 | Radcliffe | July 1, 1958 |
| 2,884,545 | Houck | Apr. 28, 1959 |
| 2,888,622 | Mooers | May 26, 1959 |